(12) United States Patent
Almeida et al.

(10) Patent No.: US 8,056,952 B2
(45) Date of Patent: Nov. 15, 2011

(54) NESTED SEATING UNIT

(75) Inventors: Ryan Almeida, Narragansett, RI (US); Siddartha Butalia, Singapore (SG); Young Eun Choi, Centreville, VA (US); Kyle Holland, East Windsor, NJ (US); Ajmal Shamsudeen, Cochin Kerala (IN)

(73) Assignee: International Truck Intellectual Property Company, LLC, Warrenville, IL (US)

( * ) Notice: Subject to any disclaimer, the term of this patent is extended or adjusted under 35 U.S.C. 154(b) by 391 days.

(21) Appl. No.: 12/477,274

(22) Filed: Jun. 3, 2009
(Under 37 CFR 1.47)

(65) Prior Publication Data
US 2010/0007163 A1 Jan. 14, 2010

Related U.S. Application Data

(60) Provisional application No. 61/058,641, filed on Jun. 4, 2008.

(51) Int. Cl.
*B60N 2/30* (2006.01)

(52) U.S. Cl. ........................................................ 296/37.8

(58) Field of Classification Search .................. 296/37.8; 297/239, 188.11, 183.6
See application file for complete search history.

(56) References Cited

U.S. PATENT DOCUMENTS

| | | | |
|---|---|---|---|
| 4,889,377 A | 12/1989 | Hughes | |
| 4,917,430 A | 4/1990 | Lawerence | |
| 5,161,700 A | 11/1992 | Stannis et al. | |
| 6,129,401 A | 10/2000 | Neag et al. | |
| 6,773,050 B1 * | 8/2004 | Hotary et al. | 296/64 |
| 6,874,850 B2 * | 4/2005 | Berkowicz | 297/239 |
| 7,843,724 B2 * | 11/2010 | Shiga et al. | 365/185.03 |

* cited by examiner

*Primary Examiner* — Lori Lyjak
(74) *Attorney, Agent, or Firm* — Jeffrey P. Calfa; Mark C. Bach; Gerald W. Askew

(57) ABSTRACT

A nested seating unit for use in a motor vehicle is provided. The nested seating unit comprises a first seat having a seating surface and a second seat having a seating surface. The nested seating unit is adjustable between a first position and a second position. In the first position, the first seat and the second seat have a first lateral distance between them, and in the second position, the first seat and the second seat have a second lateral distance between them. The first lateral distance is greater than the second lateral distance.

17 Claims, 8 Drawing Sheets

NESTED SEATING UNIT

CROSS REFERENCE TO RELATED APPLICATION

This application claims priority from provisional U.S. application Ser. No. 61/058,641, filed Jun. 4, 2008 and entitled StowRage, the teachings of which are incorporated by reference herein in their entirety.

TECHNICAL FIELD

A nested seating unit for a motor vehicle, and more particularly a nested seating unit storage system for a motor vehicle, is provided herein.

BACKGROUND

Motor vehicles, particularly trucks, are increasingly used as multipurpose vehicles. Accordingly, such motor vehicles are often used to transport passengers, personal items, and business items. While the needs of a particular user may differ depending on occasion, and from one user to another, all users want a safe and secure method of transporting passengers and items in the motor vehicle. Further, due to the various and ever changing needs of a particular user, users need a system which is easily adaptable to their particular need on a particular occasion. Thus, there is a need to provide a diversified storage system for motor vehicles. There is also a need for in-vehicle storage units that make efficient use of both passenger and storage space. Finally, there is a need to provide a system that is easily and quickly adaptable to both transportation and storage needs.

SUMMARY

A nested seating unit for use in a motor vehicle is provided. The nested seating unit is adjustable between at least a first position and a second position. The nested seating unit comprises a first seat having a first seating surface and a second seat having a second seating surface. In the first position, the first seat is disposed at a first distance from the second seat. In the second position, the first seat is disposed at a second distance from the second seat. The first distance is greater than the second distance.

In another embodiment, a nested seating unit system for a motor vehicle is provided. The nested seating unit system is adjustable between at least a first position and a second position. The nested seating system comprises a first seat, a second seat, and a first wall mounted channel. The first seat has a first seating surface and at least a first channel engaging roller. The second seat has a second seating surface. The first channel engaging roller of the first seat engages the first wall mounted channel to restrict movement of the first seat along a first axis as the first seat moves laterally from the first position to the second position. When the nested seating unit system is disposed in the first position, the first seat is disposed a first lateral distance from the second seat. When the nested seating unit system is disposed in the second position, the first seat is disposed a second lateral distance from the second seat. The first lateral distance is greater than the second lateral distance.

A method of adjusting a nested seating unit for a motor vehicle is provided. The nested seating unit comprises a first seat, a second seat, and a first wall channel. The first and second seats each have a respective seating surface. At least one of the first and second seats has a seat release portion and at least one locking pin. The first wall channel has a plurality of locking holes. The seat release portion of at least one of the first and second seats is engaged. The at least one locking pin is removed from one of the plurality of locking holes in the first wall channel in response to engaging the seat release portion. The nested seating unit is adjusted from a first position to a second position. When the nested seating unit is in the first position, the first and second seats have a first lateral distance between them. When the nested seating unit is in the second position, the first seat and the second seat have a second lateral distance between them. The first lateral distance is greater than the second lateral distance. The seat release portion of the at least one of the first and second seats is disengaged. The at least one locking pin is placed into one of the plurality of locking holes in the first wall channel in response to disengaging the seat release portion.

DETAILED DESCRIPTION

Figure 1:
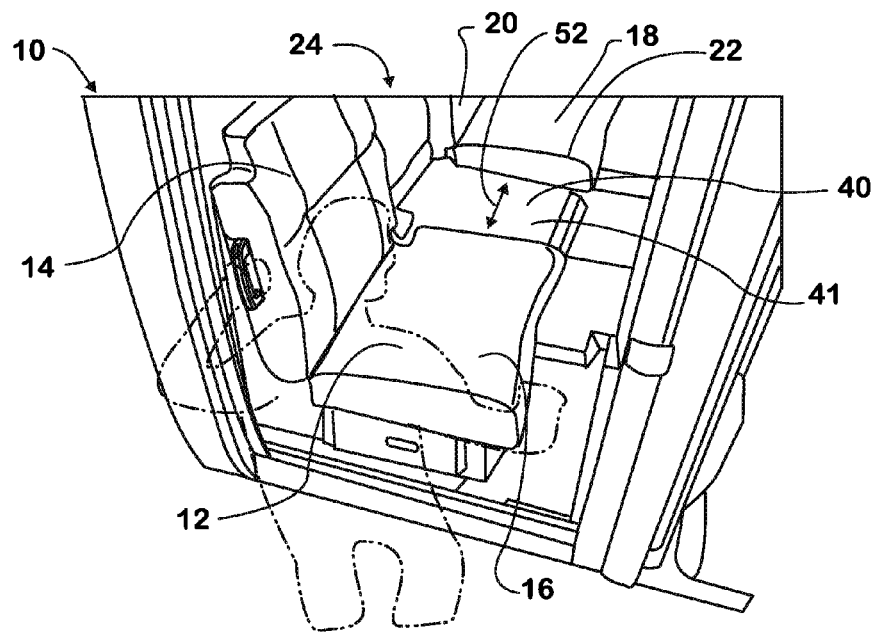
FIG. 1 is a perspective view of a nested seating unit in the first position.

A nested seating unit 10 for use in a motor vehicle is shown in FIGS. 1-10. One embodiment of the nested seating unit 10 is shown in FIG. 1. The nested seating unit 10 includes a first seat 12 having a first back support 14 and a first seating surface 16. A second seat 18 also includes a second back support 20 and second seating surface 22. While the first and second seats 12, 18 as shown in FIG. 1 are generally identical, it is contemplated that seats including different features may be used.

Figure 2:
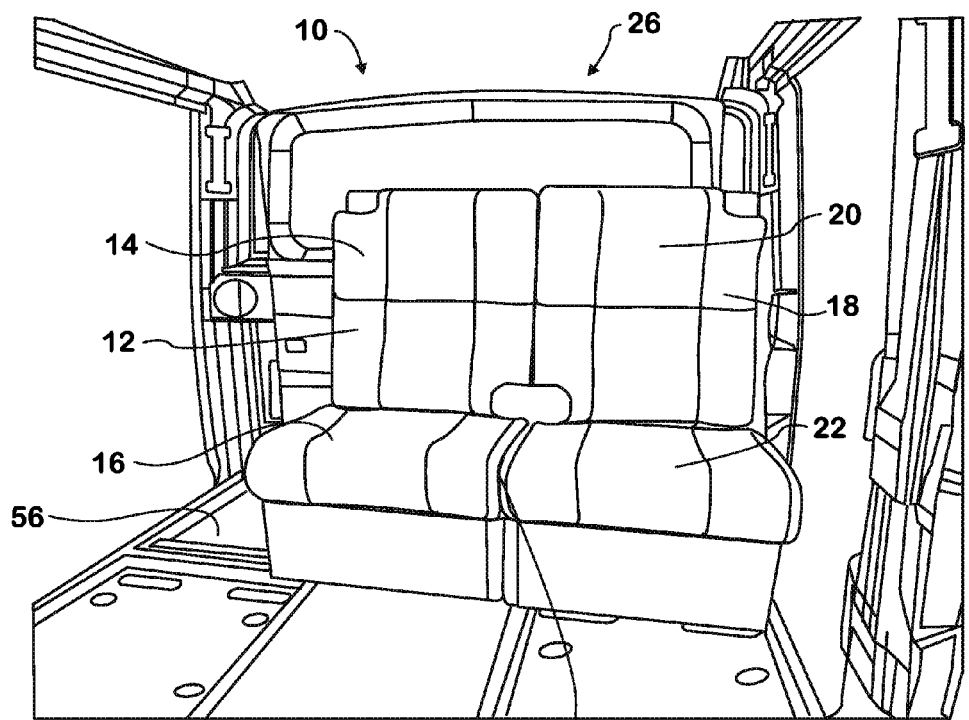
FIG. 2 is a front view of the nested seating unit of FIG. 1 in the second position.
Figure 3:
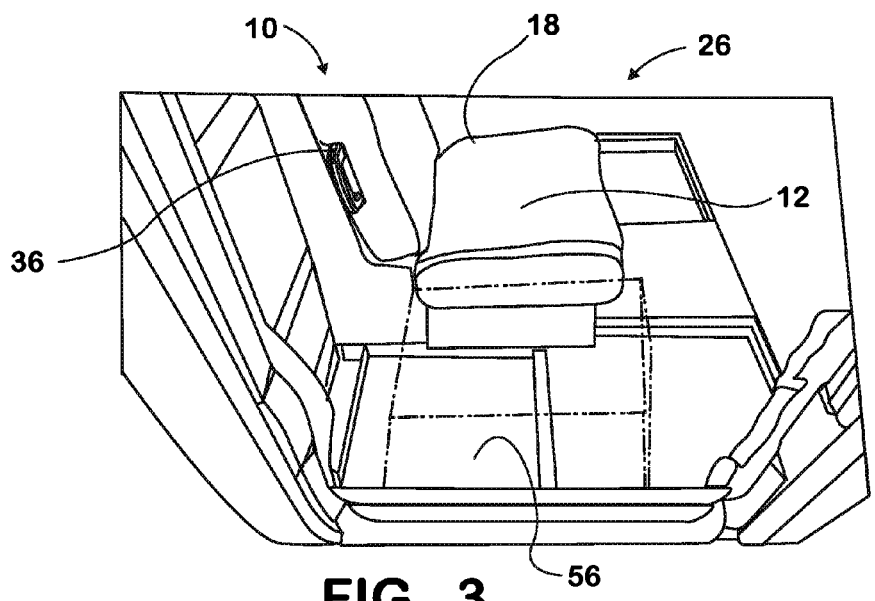
FIG. 3 is a side view of the nested seating unit of FIG. 2.

The nested seating unit 10 is adjustable between a first position 24 and a second position 26. In the first position 24, as shown in FIG. 1, the first seat 12 and the second seat 18 have a first lateral distance 52 between them. In the second position 26, as shown in FIGS. 2 and 3, the first seat 12 and the second seat 18 have a second lateral distance 54 between them. As illustrated by the drawings, the first lateral distance 52 is greater than the second lateral distance 54. The second lateral distance 54 may approach zero, as shown in FIG. 2, such that the first seat 12 and the second seat 18 are proximate one another. The first and second lateral distances 52, 54 are not necessarily predetermined or constants. For example, depending on a user's storage needs, the lateral distance the user adjusts the nested seating unit 10 may vary, therefore the nested seating unit is provided with multiple adjustment positions as discussed more fully below.

The first and second seats 12, 18 may be made out of a variety of materials. However, the choice of materials should take into account that a user should be able to easily adjust the nested seating unit 10.

Figure 4:
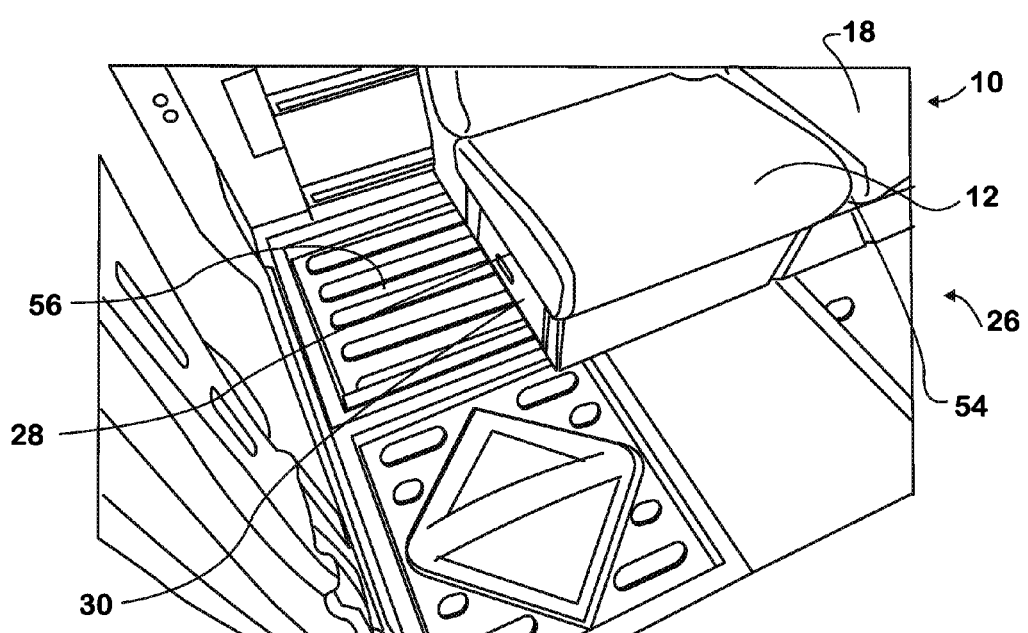
FIG. 4 is a perspective view of FIG. 3.

If a user wishes to create more storage space in a motor vehicle, the user may adjust the nested seating unit 10 by moving the first seat 12 or the second seat 18 in order to bring the seats into closer proximity, as shown in FIG. 2. Either the first seat 12 may be adjustable between the first position 24 and the second position 26, or the second seat 18 may be adjustable between the first position 24 and the second position 26. For example, as seen in FIGS. 2-4, the first seat 12 has been adjusted such that it is in the second position 26. This creates a storage space 56, as shown in FIGS. 2-4. The location of the storage space 56 is convenient for a user because the user can quickly and easily access the storage space from the outside of the motor vehicle. Once the user is done using the storage space 56, if the user desires more leg room for passengers using the nested seating unit 10, the user may adjust either the first seat 12 or the second seat 18 and move them farther apart from one another, as shown in FIG. 1.

Figure 5:
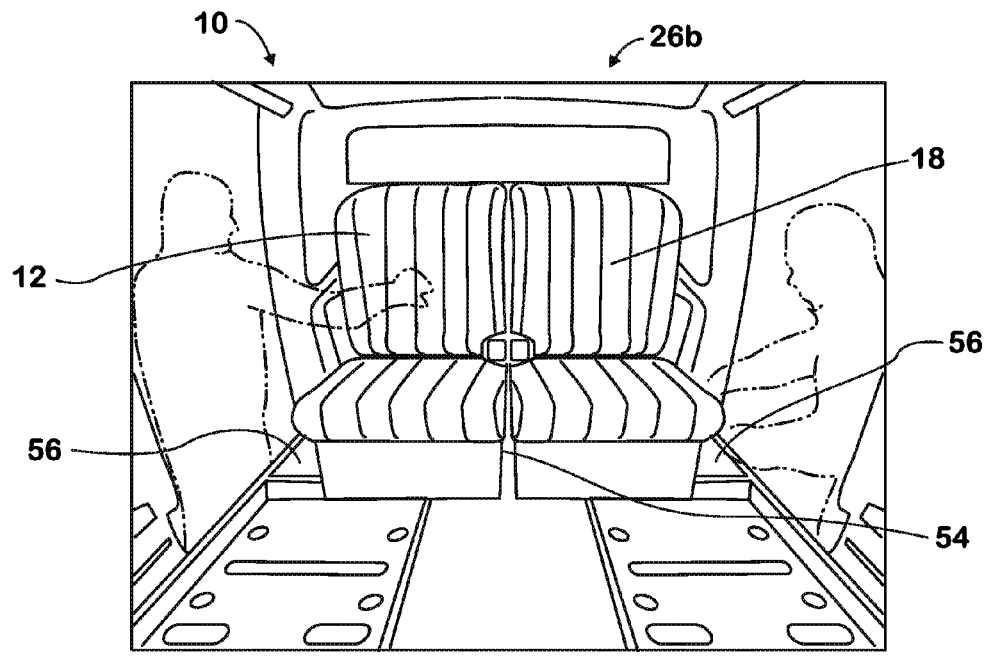
FIG. 5 is a front view of the nested seating unit of FIG. 1 in a third position.

As explained above, it is contemplated that only one of the seats 12, 18 will be adjustable. It is also contemplated that both seats 12, 18 may be adjustable. If both the first and the second seats 12, 18 are adjustable, both seats can be adjusted from the first position 24 into a third position 26b, as seen in FIG. 5. The seats 12, 18 may be independently adjustable, or they may be adjusted in a cooperative manner. This creates two storage spaces 56 on either side of the first and second seats 12, 18. Thus, if both the first and second seats 12, 18 are adjustable, the user has more options for creating the storage space 56.

Figure 6:
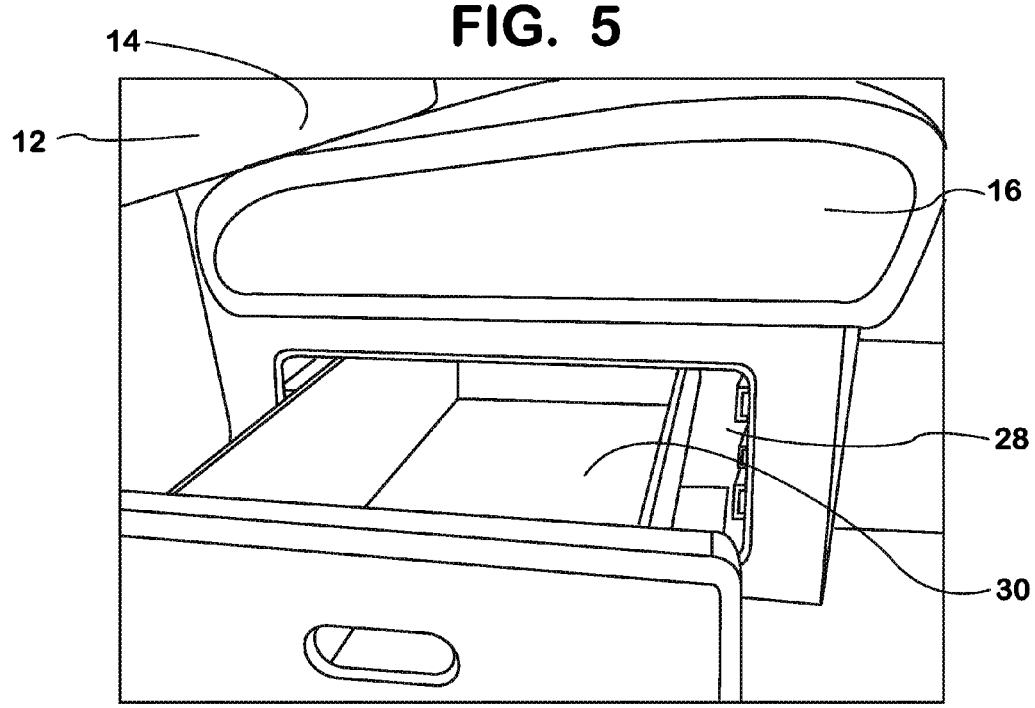
FIG. 6 is a side view of the storage cavity and the storage receptacle.

The first seat 12 may also include a storage cavity 28. The storage cavity 28 may be located beneath at least a portion of the seating surface 16, as shown in FIGS. 4 and 6. The first seat 12 may further include a first storage receptacle 30 sized to be received by the storage cavity 28. The storage receptacle 30 may be used for transporting items in a secured fashion. Placing an item in the storage receptacle 30 decreases the chance that item will be shifted and possibly damaged during transportation. The storage receptacle 30 is also concealed from the outside of the motor vehicle. Thus, a user may store an item out of sight, by placing that item in the storage receptacle 30. The storage receptacle 30 may also be removable from the storage cavity 28, allowing a user to remove the storage receptacle 30 on his or her way to a job or other destination.

The second seat 18 may also include a storage cavity 32 located beneath at least a portion of the seating surface 22. A storage receptacle 34 may be sized to be slidably received by the storage cavity 32. While the present embodiment discloses each seat 12, 18 as including a storage cavity 28, 32 and a storage receptacle 30, 34, it is also contemplated that only one of the seats 12, 18 may include these elements.

Figure 7:
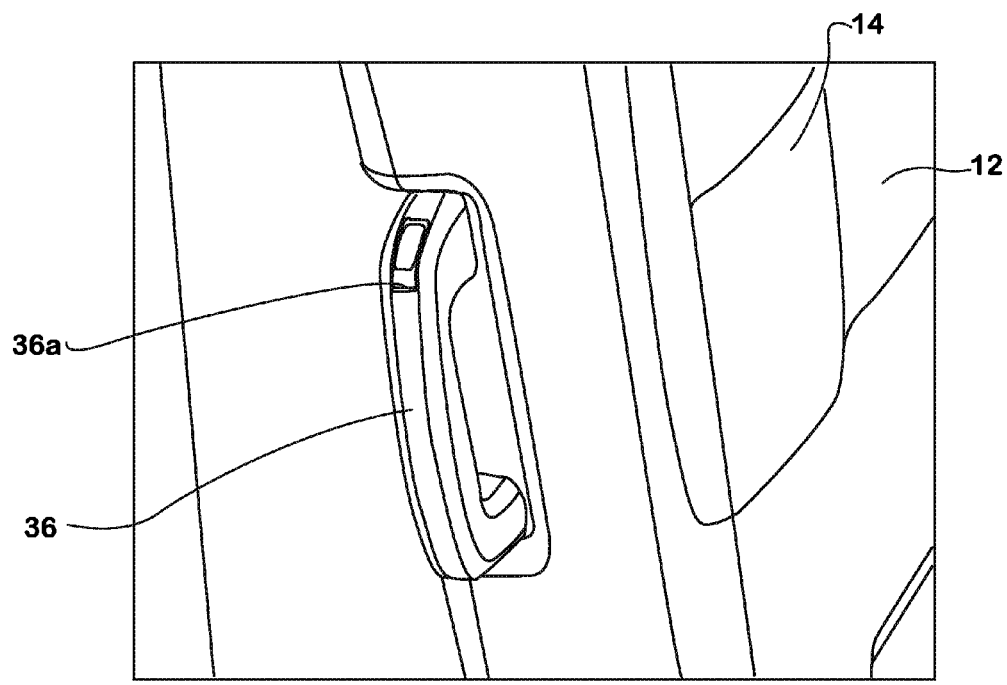
FIG. 7 is a perspective view of the handle.

As shown in FIGS. 3 and 7, a handle 36 may be attached to the first seat 12. The handle 36 may be attached to either the back support 14 or the seating surface 16 of the first seat 12. The handle 36 may also be attached to any other location which is convenient for a user. The handle 36 assists the user in adjusting the nested seating unit 10 between the first position 24 and the second position 26. Thus, the handle 36 should be located such that it can easily be grabbed and manipulated by users of varying heights and sizes. The handle 36 additionally has a seat release portion 36a. The seat release portion 36a allows the first seat 12 to be moved from a locked position as will be explained more fully below. The second seat 18 may also include a handle 38. Similar to the first handle 36, the handle 38 on the second seat 18 may be attached to the back support 20 or the seating surface 22 of the second seat. The handle additionally has a seat release portion 38a. The seat release portion 38a allows the second seat 18 to be moved from a locked position as will be explained more fully below. It is contemplated that only one of the seats 12, 18 may include a handle 36, 38, or that both seats 12, 18 may include a handle 36, 38. The handles are provided to allow a user to adjust the nested seating unit 10.

As shown in FIG. 1, the nested seating unit 10 may further comprise a third seat 40 having a third seating surface 41. The third seat 40 is located between the first seat 12 and the second seat 18. The third seat 40 is sized so that it can be received below the first seating surface 16 and the second seating surface 22 of the first seat 12 and the second seat 18, respectively. If the nested seating unit 10 is in the first position 24, such that there is less storage space 56, the third seat 40 provides an extra seat for transporting passengers. In the first position 24, the third seat 40 is adjacent to the first seat 12. However, if a user needs additional storage space 56, the third seat 40 is proportioned such that it can nest beneath the seating surfaces 16, 22 of the first seat 12 and the second seat 18. Thus, as shown in FIG. 2, in the second position 26 the first seat 12 at least partially covers the third seating surface 41 of the third seat 40. If no third seat 40 is included, there may also be an empty space between the first and second seats 12, 18. This empty space could potentially be used as another storage space.

Figure 8:
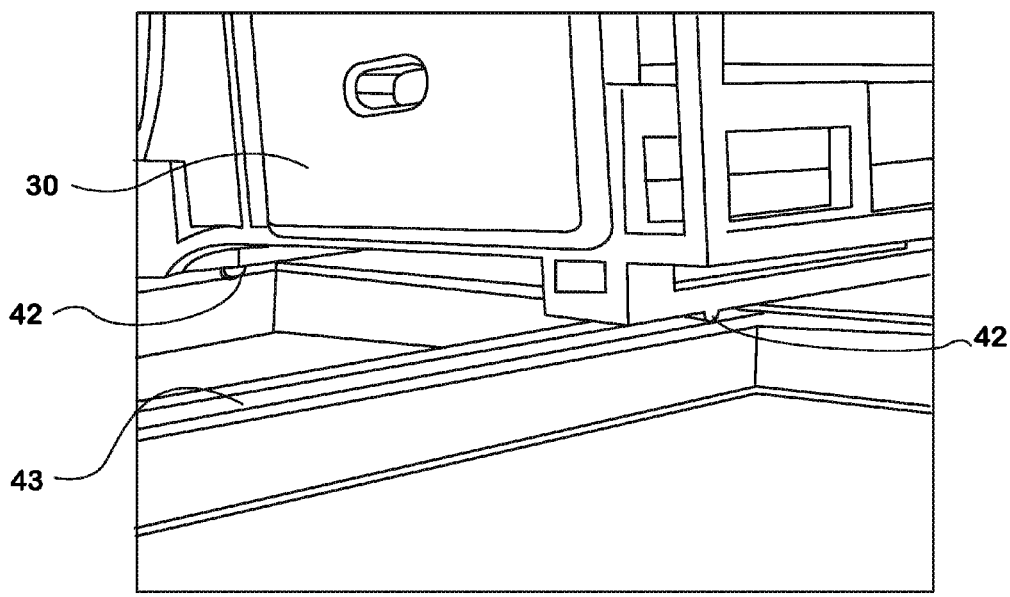
FIG. 8 is a perspective view of the wheels and tracks.

As shown in FIG. 8, and discussed more thoroughly below, a plurality of wheels 42 may be used to slidably adjust the nested seating unit 10 between the first position 24 and the second position 26. The wheels 42 may reside upon a first rail 43a and a second rail 43b to facilitate movement of the wheels 42. The first rail 43a and the second rail 43b are generally parallel. However, it is contemplated that another mechanism for adjusting the seats 12, 18 may be used. For example, the seats 12, 18 could be on tracks, ball bearings, a gliding system, or a rack and pinion in order to facilitate movement.

Figure 9:
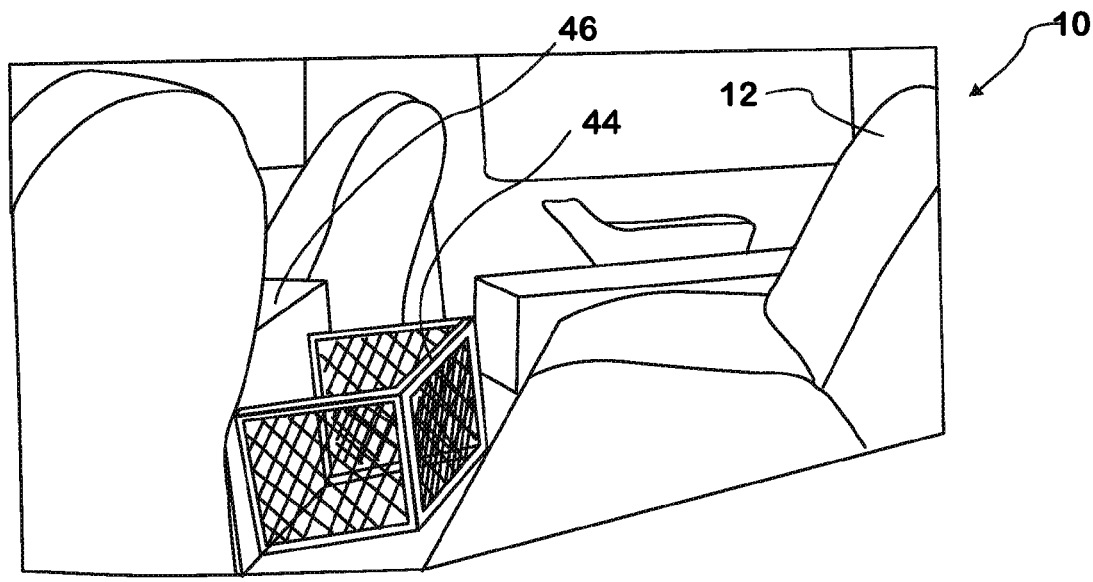
FIG. 9 is a side view of the removable console.
Figure 10:
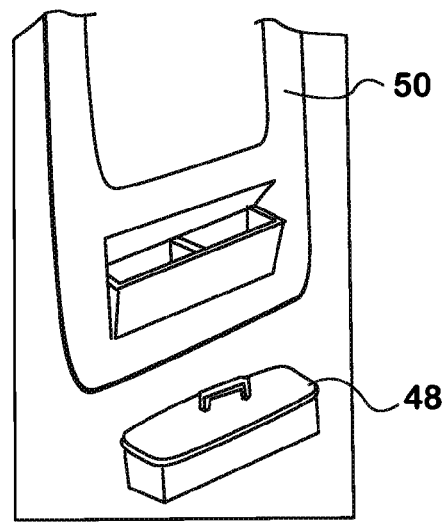
FIG. 10 is a perspective view of the removable door bin.

In one embodiment, the nested seating unit 10 may further include a removable console bin 44, as shown in FIG. 9. The console bin 44 may be slidably removable from a console 46. The console bin 44 adds additional storage for a user to take advantage of in a motor vehicle. The nested seating unit 10 may include at least one removable door bin 48, which is removable from a side door 50, as shown in FIG. 10.

Turning now to FIGS. 11-14 the nested seating unit 10 is shown with the seating surfaces 16, 22, 41 removed, as well as the removal of other non-structural covering elements of the nesting seating unit 10, showing a frame unit 58 of the nested seating unit 10. The frame unit 58 includes a first seat sub-frame 60, a second seat sub-frame 62, and a third seat sub-frame 64. Each of the first seat sub-frame 60, the second seat sub-frame 62, and the third seat sub-frame 64 comprise a plurality of structural elements 66. It is contemplated that the structural elements 66 may comprise metal tubing, such as steel tubing or aluminum tubing. It is also contemplates that the structural elements 66 may comprise metal plates. The first seat sub-frame 60 has a first front track portion 68 and a first rear track portion 70 (FIG. 14) Both the first front track portion 68 and the first rear track portion 70 have a plurality of wheels 72. Similarly, the second seat sub-frame 62 has a second front track portion 74 and a second rear track portion 76. Each of the second front track portion 74 and the second rear track portion 76 have a plurality of wheels (not shown) that are generally identical to the wheels 72.

The third seat sub-frame 64 is fixedly attached to a cab of the vehicle. For example, the third seat sub-frame 64 may be welded to the cab, bolted to the cab, riveted to the cab, screwed to the cab.

Figure 11:
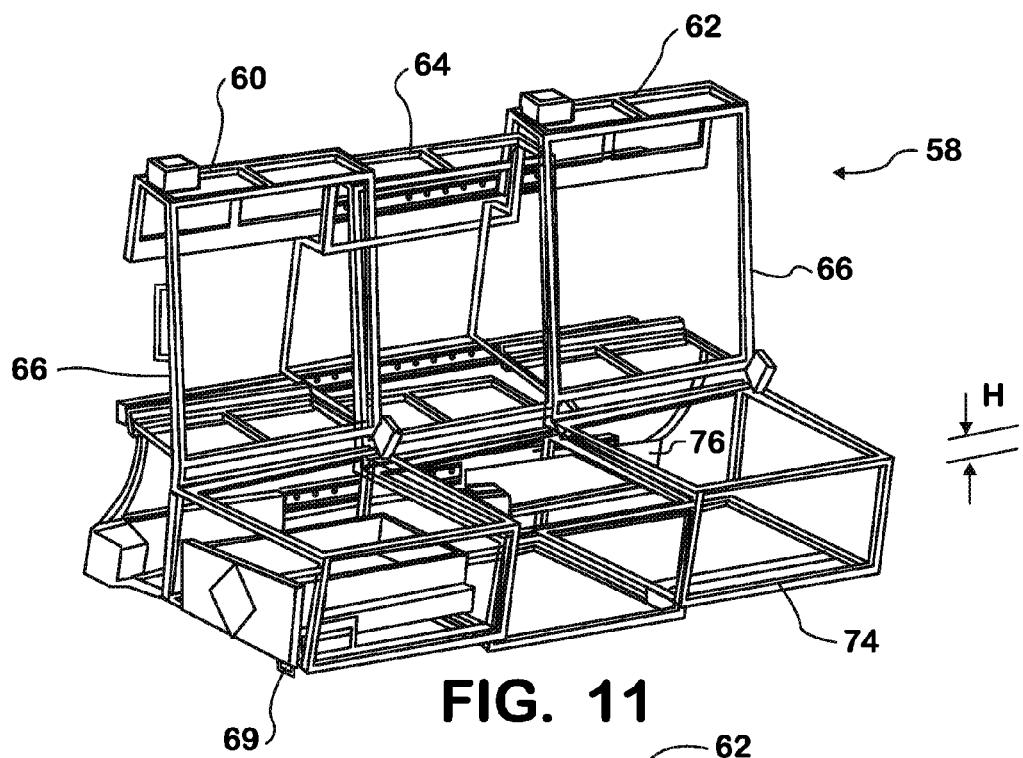
FIG. 11 is a perspective view of a frame of the nested seating unit of FIG. 1 in the first position.

As shown in FIG. 11, a distance H exists between the first seat sub-frame 60 and the third seat sub-frame 64. Similarly, the distance H exists between the second seat sub-frame 62 and the third seat sub-frame 64. The distance H is sufficient to allow the first seat sub-frame 60 and the second seat sub-frame 62 to be slidably positioned over at least a portion of the third seat sub-frame 64. It is contemplated that the distance H may be from about 15 mm to about 55 mm. The distance H may vary depending on cushioning used over the third seat sub-frame 64, such that distance H is larger when additional padding is used.

Figure 12:
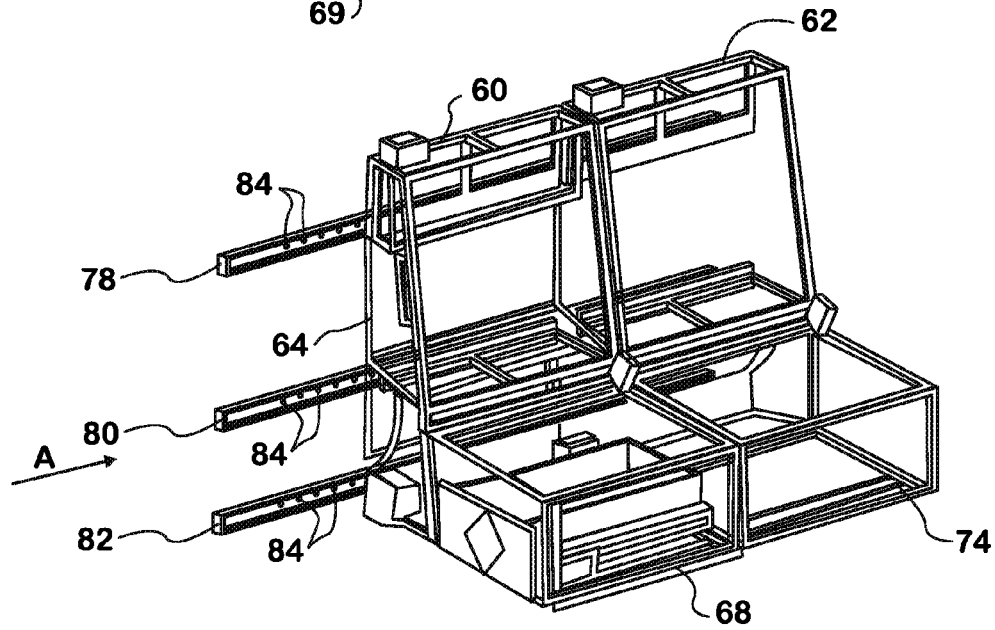
FIG. 12 is a perspective view of the frame of the nested seating unit of FIG. 1 in the second position.

Turning now to FIG. 12, the first seat sub-frame 60 has been moved in a lateral direction shown by arrow A to a nested position over the third seat sub-frame 64. As clearly shown in FIG. 12, the frame unit 58 of the nested seating unit 10 includes a first wall channel 78, a second wall channel 80, and a third wall channel 82. The first, second, and third wall channels 78, 80, 82 are adapted to mount to a rear wall of a vehicle cab that contains the nested seating unit 10.

Figure 16:
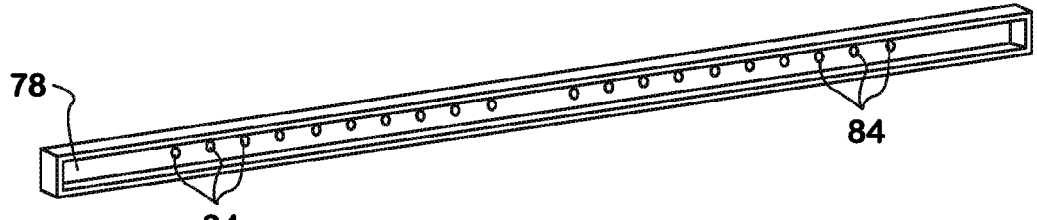
FIG. 16 is a perspective view of a channel adapted to secure the frame of a portion of the nested seating unit.

Each of the first, second, and third wall channels 78, 80, 82 has a plurality locking holes 84. The first, second, and third wall channels 78, 80, 82 are generally identical. A detailed view of the first wall channel 78 is shown in FIG. 16. The locking holes 84 receive locking pins 88 (FIG. 14) located on the first seat sub-frame 60 and the second seat sub-frame 62. The plurality of locking holes 84 are spaced to allow the first seat sub-frame 60 and the second seat sub-frame 62 to be secured in a number of locations along the wall channels 78, 80, 82 by the locking pins 88 of the first and second seat sub-frames 60, 62. Thus, for example, the first seat sub-frame 60 maybe locked in a fully nested position over the third seat sub-frame 64, such as shown in FIG. 12, a partially nested position over the third seat sub-frame 64, such as shown in FIG. 13, or an un-nested position over the third seat sub-frame 64, as shown in FIG. 11.

Additionally, the first, second, and third wall channels 78, 80, 82 each receive at least one of a plurality of channel rollers 86 (FIG. 14) located on the first seat sub-frame 60 and the second seat sub-frame 62. The channel rollers 86 interact with the wall channels 78, 80, 82 to restrict the first seat sub-frame 60 and the second seat sub-frame 62 from being moved in a direction other than the lateral direction shown by arrow A or arrow B of FIG. 13.

Figure 13:
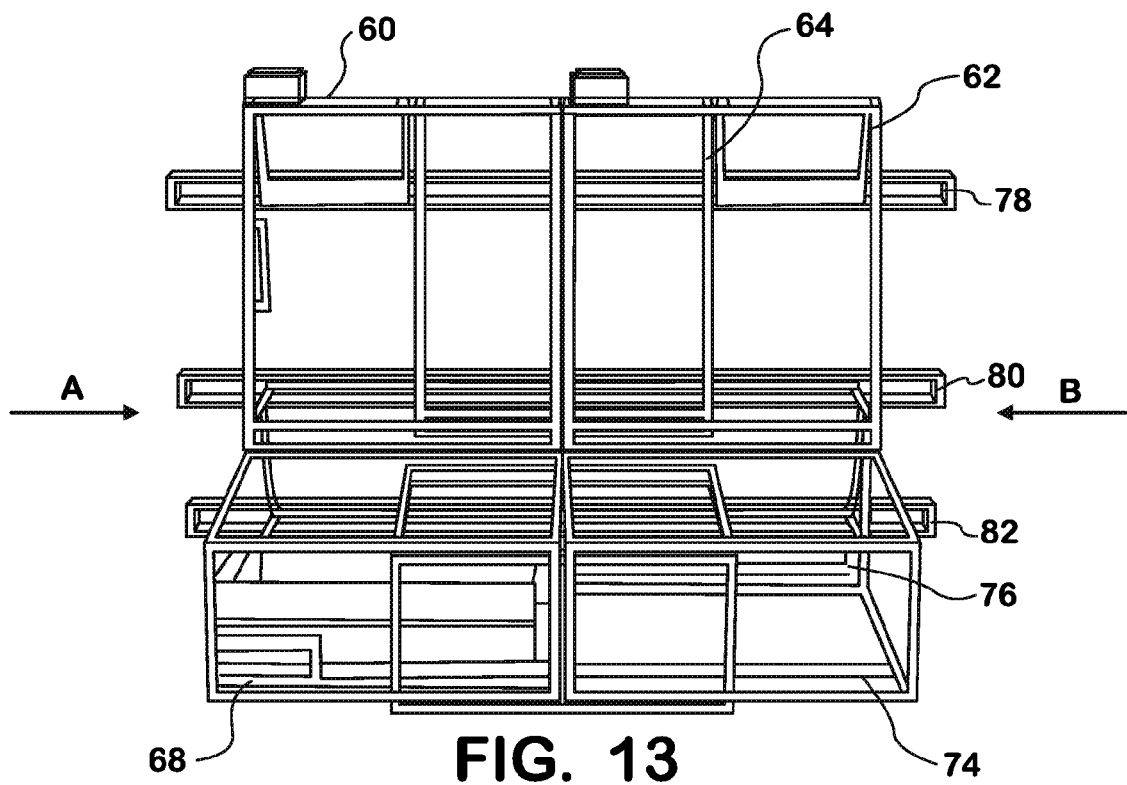
FIG. 13 is a perspective view of the frame of the nested seating unit of FIG. 1 in the third position.

As shown in FIG. 13, the first seat sub-frame 60 has been moved in a lateral direction shown by arrow A to a partially nested position over the third seat sub-frame 64, while the second seat sub-frame 62 has been moved in a lateral direction shown by arrow B to a partially nested position over the third seat sub-frame 64. At least some of the locking holes 84 of the first, second, and third wall channels 78, 80, 82 receive locking pins 88 (FIG. 14) of the first and second seat sub-frames 60, 62 to securely position the first and second sub-frames 60, 62.

Figure 14:
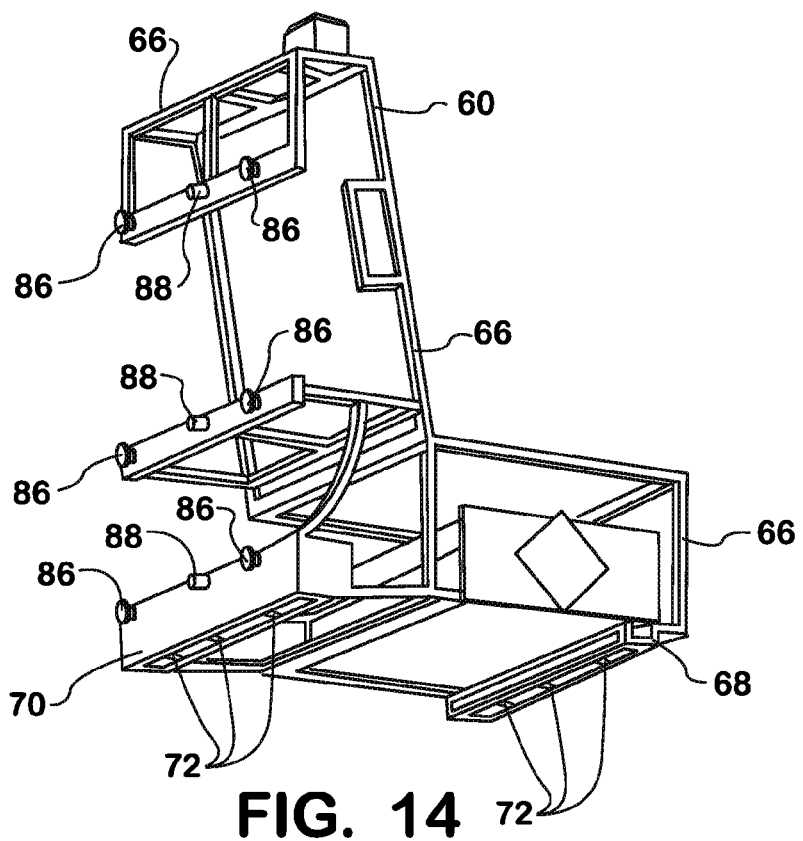
FIG. 14 is a rear perspective view of the frame of a portion of the nested seating unit.

Turning now to FIG. 14, the first seat sub-frame 60 is shown in greater detail. It is contemplated that the second seat sub-frame 62 is a mirror image of the first seat sub-frame 60, thus, the description of the first seat sub-frame 60 equally applies to the second seat sub-frame 62. As shown in FIG. 14, the first seat sub-frame 60 has the first front track portion 68 and the first rear track portion 70. Both the first front track portion 68 and the first rear track portion 70 have a plurality of wheels 72. Additionally, the first seat sub-frame 60 has a plurality of channel rollers 86 and a plurality of locking pins 88. The channel rollers 86 and the locking pins 88 interact with the first, second, and third wall channels 78, 80, 82 as described above.

The locking pins 88 may be retracted based upon depression of the seat release portion 36a of the first seat portion 12 or depression of the seat release portion 38a of the second seat portion 18. Once the locking pins 88 are retracted from the locking holes 84 of the wall channels 78, 80, 82, the first seat sub-frame 60 and the second seat sub-frame 62 may be moved in the lateral direction of arrow A or arrow B as shown in FIG. 13. When the seat release portion 36a and second seat release portion 38a are allowed to return to an un-depressed position, each of the locking pins 88 reengage with locking holes 84, preventing movement of both the first seat sub-frame 60 and the second seat sub-frame 62. The movement of the first seat portion 12 corresponds to movement of the first seat sub-frame 60, while movement of the second seat portion 18 corresponds to movement of the second seat sub-frame 62.

Figure 15:
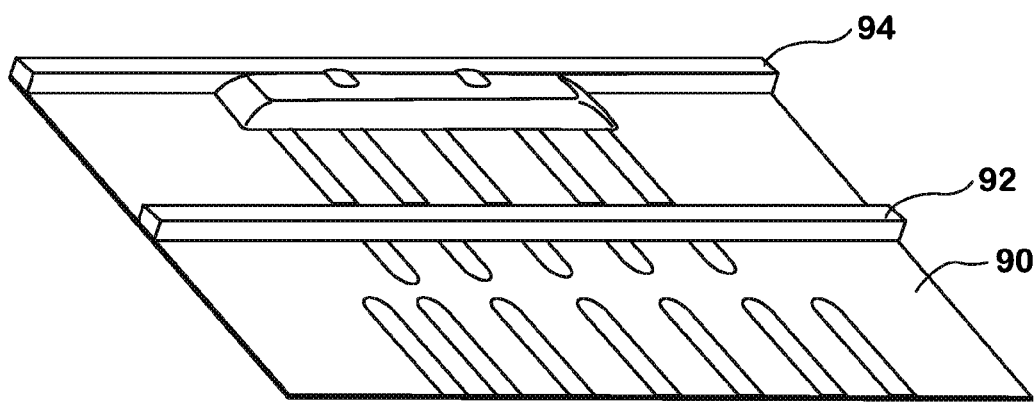
FIG. 15 is a perspective view of a floor frame portion adapted to be used with the nested seating unit system.

A floor 90 of a vehicle receiving the nested seating unit 10 is shown in FIG. 15. The floor 90 has a first rail 92 and a second rail 94. The first rail 92 provides a smooth surface for the wheels 72 of the first front track portion 68 of the first seat sub-frame 60 to engage. The first rail 92 additionally provides a smooth surface for the wheels 72 of the second track front portion 74 of the second seat sub-frame 62 to engage. Similarly, the second rail 94 provides a smooth surface for the wheels 72 of both the first rear track portion 70 and the second rear track portion 76 to engage. The smooth surface provided by the first rail 92 and the second rail 94 eases the movement of the first seat sub-frame 60 and the second seat sub-frame 62.

What is claimed is:

1. A nested seating unit for a motor vehicle, the nested seating unit being adjustable between at least a first position and a second position and comprising:
   a first seat having a first seating surface; and
   a second seat having a second seating surface,
   wherein when the nested seating unit is in the first position the first seat is disposed at a first lateral distance from the second seat, and wherein when the nested seating unit is in the second position, the first seat is disposed at a second lateral distance from the second seat, the first lateral distance being greater than the second lateral distance.

2. The nested seating unit of claim 1, wherein the first seat is adjustable between the first position and the second position.

3. The nested seating unit of claim 1, wherein the second seat is adjustable between the first position and the second position.

4. The nested seating unit of claim 1, wherein the first seat and the second seat are independently adjustable between the first position and the second position.

5. The nested seating unit of claim 1, wherein at least one of the first seat and the second seat includes a storage cavity disposed beneath at least a portion of at least one of the first seating surface and the second seating surface.

6. The nested seating unit of claim 5, wherein a storage receptacle is sized to be slidably received by the storage cavity.

7. The nested seating unit of claim 1, wherein a handle is attached to the first seat.

8. The nested seating unit of claim 1, wherein a handle is attached to the second seat.

9. The nested seating unit of claim 1 further comprising a third seat having a third seating surface, the third seat being located between the first seat and the second seat.

10. The nested seating unit of claim 9, wherein the third seat is sized to be received below at least one of the first seating surface of the first seat and the second seating surface of the second seat.

11. The nested seating unit of claim 1, wherein wheels are used to adjust the nested seating unit between the first position and the second position.

12. The nested seating unit of claim 1 further comprising a removable console bin, the console bin being slidably removable from a console.

13. The nested seating unit of claim 1 further comprising at least one removable door bin, the door bin being removable from a side door.

14. A nested seating unit system for a motor vehicle, the nested seating unit system being adjustable between at least a first position and a second position and comprising:
   a first seat having a first seating surface and at least a first channel engaging roller;
   a second seat having a second seating surface; and
   a first wall mounted channel;
   wherein the first channel engaging roller of the first seat engages the first wall mounted channel to restrict movement of the first seat along a first axis as the first seat moves from the first position to the second position, and wherein when the nested seating unit system is disposed in the first position the first seat is disposed a first lateral distance from the second seat, and wherein when the nested seating unit system is disposed in the second position the first seat is disposed a second lateral distance from the second seat, the first lateral distance being greater than the second lateral distance.

15. The nested seating unit system of claim 14, wherein at least one of the first seat and the second seat includes a storage cavity disposed beneath at least a portion of the first seating surface and the second seating surface.

16. The nested seating unit system of claim 15, wherein the at least one of the first seat and the second seat includes a storage receptacle sized to be slidably received by the storage cavity.

17. A method of adjusting a nested seating unit for a motor vehicle, wherein the nested seating unit comprises a first seat, a second seat, and a first wall channel, the first and second seats each having a respective seating surface, and at least one of the first and second seats having a seat release portion, at least one locking pin, the first wall channel having a plurality of locking holes, the method comprising:
   engaging the seat release portion of at least one of the first and second seats;
   removing the at least one locking pin from one of the plurality of locking holes in the first wall channel in response to engaging the seat release portion;
   adjusting the nested seating unit from a first position to a second position, wherein when the nested seating unit is in the first position, the first and second seats have a first lateral distance between them, and when the nested seating unit is in the second position, the first seat and the second seat have a second lateral distance between them, the first lateral distance being greater than the second lateral distance;
   disengaging the seat release portion of the at least one of the first and second seats;
   placing the at least one locking pin into one of the plurality of locking holes in the first wall channel in response to disengaging the seat release portion.

* * * * *